United States Patent [19]

Siebmanns

[11] 4,322,458

[45] Mar. 30, 1982

[54] MOLDED CERAMIC MEMBER, PARTICULARLY OF SILICON CERAMIC, AND METHOD FOR THE MANUFACTURE THEREOF

[75] Inventor: Wilhelm Siebmanns, Dachau, Fed. Rep. of Germany

[73] Assignee: Motoren-und Turbinen Union, Munich, Fed. Rep. of Germany

[21] Appl. No.: 930,987

[22] Filed: Aug. 4, 1978

[30] Foreign Application Priority Data

Aug. 18, 1977 [DE] Fed. Rep. of Germany ....... 2737227

[51] Int. Cl.$^3$ ........................ B05D 1/40; B05D 3/00
[52] U.S. Cl. ............................... 427/331; 427/376.3; 427/404; 427/419.2; 427/423; 427/427; 427/429; 427/443.2
[58] Field of Search .......... 427/376 A, 376 B, 376 C, 427/430 R, 430 B, 419 A, 404, 383 B, 133, 125, 190, 126, 201, 423, 368, 331, 427, 429, 226, 370, 443.2; 428/539, 472, 450, 76, 446; 65/60 D, 60 C; 264/62, 65, 81, 235, 346

[56] References Cited

U.S. PATENT DOCUMENTS

| | | | |
|---|---|---|---|
| 2,433,847 | 1/1948 | Jennings et al. | 428/76 |
| 2,861,900 | 11/1958 | Smith et al. | 427/423 |
| 2,893,891 | 6/1959 | Bradstreet et al. | 427/383 B |
| 3,010,188 | 11/1961 | Bol et al. | 428/450 |
| 3,087,831 | 4/1963 | Browne | 428/434 |
| 3,404,020 | 10/1968 | Woolley | 427/423 |
| 3,617,358 | 11/1971 | Dittrich | 427/423 |
| 3,619,233 | 11/1971 | Hipp et al. | 428/450 |
| 3,755,065 | 8/1973 | Chvatal | 428/432 |
| 3,798,114 | 3/1974 | Chvatal | 428/472 |
| 3,811,938 | 5/1974 | Hirose et al. | 427/126 |
| 3,978,272 | 8/1976 | Donley | 428/472 |
| 4,056,643 | 11/1977 | Kume | 427/226 |
| 4,084,314 | 4/1978 | Chakrabarty et al. | 427/190 |

FOREIGN PATENT DOCUMENTS

696256 10/1964 Canada .............................. 427/226

OTHER PUBLICATIONS

Hausner, Coatings of High-Temperature Materials, pp. 209 & 210, 1966.

Primary Examiner—S. L. Childs
Attorney, Agent, or Firm—Scully, Scott, Murphy & Presser

[57] ABSTRACT

An encapsulated ceramic molded member for high-temperature isostatic pressing which precludes the danger of deformation caused by a capsule material and in which, more particularly, a capsule material comes into consideration which will withstand the extremely high temperatures encountered during high-temperature isostatic pressing and which will be compatible with the ceramic material of the molded member, as well as a method for the encapsulation of such molded members. The molded member is coated with a material having the composition $Ag_2O \cdot (\text{refractory metal} \cdot O_x)$, or mixtures of such materials according to the composition $Ag_2O \cdot (\text{refractory metals} \cdot O_x)$.

9 Claims, No Drawings

MOLDED CERAMIC MEMBER, PARTICULARLY OF SILICON CERAMIC, AND METHOD FOR THE MANUFACTURE THEREOF

BACKGROUND OF THE INVENTION

1. Field of the Invention

The present invention relates to a molded member formed of ceramic, particularly silicon ceramic, and a method for manufacture thereof. Molded members of this type are highly compressed through high-temperature isostatic pressing (HIP), which is the simultaneous application of an all-sided effective high pressure and of high temperature. In order to prevent the gas which is commonly used in the pressing process as a pressure-transmissive medium from penetrating into the molded member and thus leading to a pressure equalization, the molded members must be encapsulated in a gas-tight manner.

2. Discussion of the Prior Art

It is currently known to achieve an encapsulation of this type by means of a glass coating which encompasses the molded member wherein the ceramic molded member is first placed in a glass container, the container is thereafter evacuated and sealed by being melted together, and subsequently when heated within the context of the high-temperature isostatic pressing is converted into a viscous condition and adheres to the surface of the ceramic molded member. A disadvantage of this known process lies in the risk that at an excessively high viscosity of the glass layer adhering to the surface of the ceramic molded member, the geometric shape of the molded member is changed in an impermissible manner.

SUMMARY OF THE INVENTION

Accordingly, it is a primary object of the present invention to provide a ceramic molded member for the high-temperature isostatic pressing which precludes the danger of deformation caused by the capsule material and in which, more particularly, a capsule material comes into consideration which will withstand the extremely high temperatures encountered during high-temperature isostatic pressing and which will be compatible with the ceramic material of the molded member, as well as a method for the encapsulation of such molded members.

It is a more specific object of the present invention to inventively coat the molded members with a material having the composition $Ag_2O.$ (refractory metal. $O_x$), or mixtures of such materials according to the composition $Ag_2O.$ (refractory metals. $O_x$).

Coming into consideration as the refractory metals are, in particular, tungsten, molybdenum and tantalum. The use of these silver tungstates, molybdates and tantalates, and mixtures thereof as the capsule material, allows for the adjustment of the viscosity of the capsule material in a preferred manner so that, on the one hand, there is assuredly precluded deformation of the molded member due to excessive viscosity and, on the other hand, there is avoided any penetration of the capsule material into the pores of the ceramic molded member as a result of a too low viscosity.

The invention further provides a method for the encapsulation of porous molded members of ceramic material, which is distinguished by the following process steps:

(a) Form a solution or slurry of fine silver powder and of oxides of the refractory metals;
(b) apply the solution onto the molded member by dipping, brushing on or spraying;
(c) anneal the solution-coated molded member at a temperature of from 900° to 1400° C.

In this process, the desired chemical compound of the coating layer is produced during the course of the last process step, where there is concurrently burned off the organic lacquer which is preferably used as the solvent medium for the solution.

In a further aspect of the present invention there is proposed a method for encapsulating porous molded members of the above-mentioned type which is characterized in that a powder formed of silver and oxides of refractory metals is deposited on the molded member by flame spraying. Deposition of the encapsulating layer by means of the flame spraying process provides the advantage in that no solvent is needed for the various constituents of the coating material and that reannealing of the deposited encapsulating layer is no longer necessary, since the chemical transformation of the powders deposited by flame spraying into the final formation will be carried out during the flame spraying process itself.

Another aspect of the present invention contemplates a method for encapsulating porous molded members of the above-mentioned type which is characterized in that a solution or slurry formed from a powder having the composition $Ag_2O.$ (refractory metal. $O_x$) is deposited on the molded member by dipping, brushing on or spraying, and that this coating is thereafter baked in.

Pursuant to a further aspect of the present invention, a powder having the composition $Ag_2O.$ (refractory metal. $O_x$) is deposited on the molded member by means of flame spraying. The production of such a coating powder is preferably effected in that silver and oxides of refractory metals are jointly annealed and the resulting compound is thereafter comminuted.

A further process contemplated by the present invention for encapsulating porous molded members of the above-mentioned type is inventively characterized in that layers of silver and refractory metals are alternately deposited on the molded members and the thus coated molded members are annealed in an oxygen atmosphere. Thereby produced as the encapsulating layer on the molded members is the material previously mentioned hereinabove having the composition $Ag_2O.$ (refractory metal. $O_x$).

Finally, the present invention also relates to a method for the high-temperature isostatic pressing of porous molded members of ceramic, in particular silicon ceramic, and which is characterized in that for effecting a pressure-tight encapsulation, the molded member is placed within a capsule formed from a material having the composition $Ag_2O.$ (refractory metal. $O_x$), or the composition $Ag_2O.$ (refractory metals. $O_x$), and wherein the capsule is then sealed by being melted together. In this inventive method, the capsule melts during the course of the high-temperature isostatic pressing and adheres to the molded members in the form of a surface layer.

What is claimed is:

1. Method for preparing a porous molded member formed of a silicon ceramic material for hot isostatic pressing by encapsulating it with a coating constructed of a material having the composition $Ag_2O.$ (refractory metal. $O_x$) or mixtures of such materials corresponding to the composition $Ag_2O \cdot (\text{refractory metals} \cdot O_x)$, comprising the steps of:

(a) forming a slurry of fine silver powder and of oxides of refractory metals selected from the group consisting of tungsten, molybdenum and tantalum;

(b) depositing said slurry on said molded member; and (c) annealing said slurry-coated molded member in atmosphere at a temperature of within 900° to 1400° C.

2. Method as claimed in claim 1, said slurry being deposited on said molded member by dipping.

3. Method as claimed in claim 1, said slurry being deposited on said molded member by brushing on.

4. Method as claimed in claim 1, said slurry being deposited on said molded member by spraying.

5. Method as claimed in claim 1, said silver powder and refractory metal oxides being deposited on said molded member by flame spraying.

6. Method as claimed in claim 1, said coating comprising a powder having the composition $Ag_2O \cdot (\text{refractory metal} \cdot O_x)$ being deposited on said molded member; and thereafter reannealing said coating.

7. Method as claimed in claim 1, comprising forming said coating by depositing a powder having the composition $Ag_2O \cdot (\text{refractory metal} \cdot O_x)$ on said molded member by flame spraying.

8. Method as claimed in claim 5, comprising jointly annealing said silver and oxides of refractory metals; and comminuting the resulting compound.

9. Method as claimed in claim 1, comprising depositing alternate layers of silver and refractory metals on said molded member; and annealing said coated molded member in an oxygen atmosphere.

* * * * *